United States Patent
Tewinkle et al.

[19]

[11] Patent Number: 6,141,045
[45] Date of Patent: Oct. 31, 2000

[54] METHOD FOR DETECTING DEFECTIVE PHOTOSENSOR CIRCUITS IN A PHOTOSENSOR ARRAY

[75] Inventors: Scott L. Tewinkle, Ontario; Paul A. Hosier, Rochester, both of N.Y.

[73] Assignee: Xerox Corporation, Stamford, Conn.

[21] Appl. No.: 08/934,864

[22] Filed: Sep. 22, 1997

[51] Int. Cl.[7] .................................................. H04N 9/64
[52] U.S. Cl. ........................................ 348/246; 348/207
[58] Field of Search ................................ 348/207, 294, 348/302, 307, 241, 311, 312, 246, 247; 250/208.1, 214 R; H04N 5/335, 9/64

[56] References Cited

U.S. PATENT DOCUMENTS

| | | |
|---|---|---|
| 5,081,536 | 1/1992 | Tandon et al. . |
| 5,424,529 | 6/1995 | Hashimoto et al. ................ 250/208.1 |
| 5,451,768 | 9/1995 | Hosier et al. . |
| 5,452,001 | 9/1995 | Hosier et al. . |
| 5,638,121 | 6/1997 | Hosier et al. . |
| 6,031,571 | 2/2000 | Arakawa .................................. 348/316 |
| 6,064,431 | 5/2000 | Ueno ...................................... 348/241 |

*Primary Examiner*—Tuan Ho
*Attorney, Agent, or Firm*—R. Hutter

[57] ABSTRACT

A system by which defective circuitry associated with a single photosensor in an image sensor array can be readily detected, without the defect being "covered" by a good signal from a neighboring photosensor. The output line onto which a series of photosensors and their transfer circuits output video signals is grounded via a pulldown resistor. When a defective photosensor circuit fails to place a bias on the output line, the bias on the output line quickly drifts towards zero. By detecting this relatively sudden drift towards zero bias, a defective photosensor or its associated circuitry can be identified.

6 Claims, 3 Drawing Sheets

METHOD FOR DETECTING DEFECTIVE PHOTOSENSOR CIRCUITS IN A PHOTOSENSOR ARRAY

INCORPORATION BY REFERENCE

The present application incorporates by reference U.S. Pat. Nos. 5,081,536 and 5,638,121, both assigned to the assignee hereof.

1. Field of the Invention

The present invention relates to image sensor arrays used in raster input scanners. In particular, the invention relates to photosensitive chips wherein each photosensor has its own individual transfer circuit.

2. Background of the Invention

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging generally without the use of reductive optics. In order to provide such a "full-width" array, however, relatively large silicon structures must be used to define the large number of photosensors. A preferred technique to create such a large array is to make the array out of several butted silicon chips. In one proposed design, an array is intended to be made of 20 silicon chips, butted end-to-end, each chip having 248 active photosensors spaced at 400 photosensors per inch.

Although most scanning systems currently in use are ultimately digital systems, the "raw signal" coming out of the photosensors during the scanning process is an analog video signal, with the voltage magnitude corresponding to the intensity of light impinging on the photosensor at a given time. Thus, when signals are read out from the photosensors on a chip to be converted to digital data, different video levels, corresponding, generally, to the brightness of the reflected area being scanned by a particular photosensor at a particular moment, are output as a series of analog voltage levels.

In a video-outputting chip, the total speed of output of each chip will depend on the voltage response of the output channel. Each chip outputs a sequence of voltage levels, each voltage level corresponding to a pixel in the original image. With each pixel in the original image, the voltage level must move from a signal representative of light of the previous pixel to one representative of light in the present pixel. Because of the analog nature of a video-outputting chip, the sequence of voltage outputs from one voltage level (corresponding to one pixel) to the next is a set of asymptotic curves. When the outputs of a plurality of photosensors are read out serially, certain time must be allowed between each photosensor reading to allow the reading to settle to the value of a signal corresponding to the light impinging on the photosensor. In a typical practical system for reading out the video signals, this readout time for real-time scanning is approximately 50 nanoseconds per photosensor. With each pixel signal, what is of most interest is where the analog voltage curve "ends up"—that is, the final value of the voltage signal is what is representative of the true light intensity on the photosensor. When a set of analog video signals are output over time, the portion of the output for each pixel in which the voltage level starts moving from the voltage level from the previous pixel to the voltage level of the present pixel is the settling time, which directly affects readout time.

As practical applications of image sensor arrays typically require several semiconductor chips being butted to form a longer array, it is important to provide for the testing of the individual chips before the chips are mounted in a longer array. To find that a particular chip, or an individual sensor or transfer circuit in the chip, is defective after installation in an array will require that the chip be removed from the array, an expensive and time-consuming process. It is therefore more desirable to provide systems within the structure of the chip itself to permit testing of individual photosensors and/or transfer circuits before the chips are installed on the array, or more preferably before the chips are even diced from a wafer.

One type of sensor array defect of particular interest involves sensor arrays in which a series of photosensors are caused to read out analog signals onto a output line, as the circuitry associated with each photosensor is sequentially selected by a shift register. As will be described in detail below, if one photosensor, or its ancillary circuitry, in the sequence is defective, the analog nature of the signals on the output line may cause the output of the defective photosensor/circuitry to be "hidden" by a good signal from a previously-selected photosensor, which would remain on the output line even when the defective photosensor/circuitry is selected by the shift register. The present invention addresses detection of this type of sensor array defect, so that it will not be hidden as a result of the analog nature of the video signals on the output line.

Description of the Prior Art

U.S. Pat. No. 5,081,536 discloses the basic function of an image sensor array wherein each of a plurality of photosensors is associated with a two-stage transfer circuit, and signals on each transfer circuit are sequentially selected by a shift register.

U.S. Pat. No. 5,451,768 discloses an image sensor array with two-stage transfer circuits, which further includes an on-chip test circuit whereby a desired bias to be placed on each photosensor can be externally tested.

U.S. Pat. No. 5,452,001 discloses a photosensor readout scheme for an image sensor array in which signals on each transfer circuit are sequentially selected by a shift register.

U.S. Pat. No. 5,638,121 discloses a photosensor readout scheme for an image sensor array in which signals on each transfer circuit are sequentially selected by a shift register and wherein the signals from odd and even photosensors are read out onto separate output lines.

SUMMARY OF THE INVENTION

According to one aspect of the present invention, there is provided an image sensor array, comprising a plurality of photosensors, each of the plurality of photosensors being associated with a connector, and an output line. A selector selects one of the plurality of photosensors to output a signal on the output line by closing the connector associated with the selected one of the plurality of photosensors. A pulldown resistor is interposed between the output line and ground.

According to another aspect of the present invention, there is provided a method for testing an image sensor array having an output line, a plurality of photosensors, each of the plurality of photosensors being associated with a connector to the output line, and a selector for selecting one of the plurality of photosensors to output a signal on the output line by closing the connector associated with the selected one of the plurality of photosensors. The output line is connected to ground. The selector is caused to select a series of photosensors to output a signal onto the output line in a predetermined order, while simultaneously voltage on the output line is monitored.

DETAILED DESCRIPTION OF THE INVENTION

Figure 1:
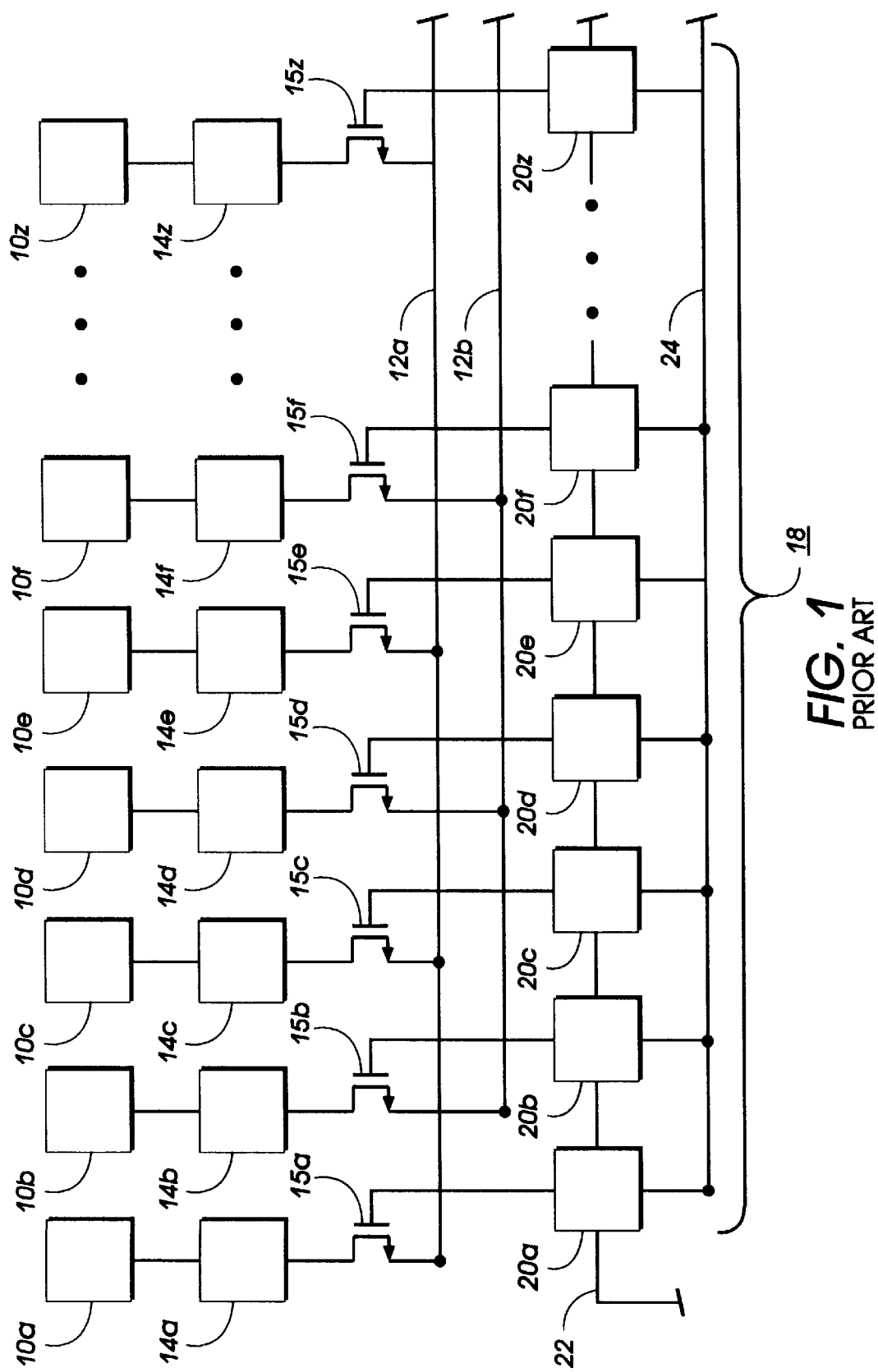
FIG. 1 is a simplified schematic showing an arrangement of circuit elements for the readout system of the present invention.

FIG. 1 is a schematic view showing the basic elements of a readout system according to the present invention. There is provided a set of photosensors $10a$ – $10z$, which are connected by transfer circuits $4a$, $14b$, etc. which in turn are activated by shift register 18 which includes a set of half-stages $20a$, $20b$, etc., which are arranged along a single line 22, and also activated by a pixel clock line 24. Significantly, in this design, there is disposed between each transfer circuit 14 and the associated output line $12a$ selector switch, or connector, $15a$, $15b$, etc. which is associated with one corresponding stage or half-stage $20a$, $20b$, etc., of shift register 18; when the appropriate stage or half-stage of shift register 18 is activated, the base of the associated connector 15 closes a connection between the transfer circuit 14 and the output line.

According to one embodiment of the present invention, the linear array of photosensors $10a$. . . $10z$ are arranged in an interleaved manner with odd and even subsets, with the odd subsets of photosensors such as $10a$ and $10c$ connected via their associated transfer circuits $14a$, $14c$, etc. to an odd output line $12a$, and the even photosensors such as $10b$ and $10d$, connected via their associated transfer circuits $14b$, $14d$, etc. to an even output line $12b$. Output line $12a$ receives the video outputs only of the odd photosensors, and the even output line $12b$ receives the video outputs only of the even photosensors. Because both the odd and even photosensors are controlled by a single shift register 18, having half-stages $20a$, $20b$, etc., the parallel video signals on odd output line $12a$ and even output line $12b$ can be output in parallel; further the odd and even video signals can be arranged to be staggered over time.

(In the art of shift registers, a "stage" is defined as a portion of a shift register that is altered with a single clock pulse, so each odd and even pair of half-stages such as $20a$ and $20b$ form a single stage according to the strict definition.

However, in the specification and claims herein, the word "stage" in this context shall also apply to a half-stages in a shift register of the illustrated design. Also, according to the invention, it is possible that a connector such as 15 responsive to the shift register 18 could be effectively incorporated into the design of the transfer circuit 14.)

An image sensor array of the basic design shown in FIG. 1, wherein a plurality of photosensors each output an analog signal onto a output line, in a manner controlled by a shift register, presents a unique type of testing problem which is here called the "tristated pixel." Briefly, a tristated pixel is a defect which results from a fault in the electronic mechanism by which the shift register selects a particular photosensor and transfer circuit to output a video signal onto the output line at a given time. The unique problem presented by a design such as in FIG. 1 is that the analog video nature of the outputs onto a output line such as $12a$, $12b$ can be hard to detect or isolate down to single photosensor or transfer circuit. For example, consider the case in which the connector $15a$, which is responsive to a selection signal from a stage $20a$ of shift register 18, works correctly, while connector $15c$, which also causes a signal to be sent to output line $12a$, is not working correctly.

In a typical test process, a chip having the photosensors $10a$. . . $10z$ thereon is placed in conditions of uniform lighting (which could conceivably be complete darkness, for a predetermined light level of zero) and the signals resultant from this uniform lighting are read out by the action of shift register 18 on the series of connector $15a$, . . . $15z$. Because of the analog nature of the outputs onto output lines $12a$ or $12b$, the first step will be that transfer circuit $14a$, outputs a signal onto output line $12a$. This output will cause a certain measurable bias to appear on line $12a$, and this bias will remain on line $12a$ until another photosensor and transfer circuit, outputting another signal, is selected by shift register 18 and caused to place a bias on line $12a$.

The problem occurs when a defect causes connector $15c$, (or transfer circuit $14c$) not to work, so that the output of transfer circuit $14c$ is not connected to output line $12a$ when connector $15c$, is selected by shift register 18. When this defect occurs, instead of the output of transfer circuit $14c$ being connected to output line $12a$, the bias caused by transfer circuit $14a$, which has been present since the previous cycle, simply remains on output line $12a$. Because the signal from transfer circuit $14a$, remains on output line $12a$ even in the "time slot" in which the signal from $14c$ is intended to be read out, downstream processing circuitry (not shown) will merely take the output from transfer circuit $14a$, as the output from transfer circuit $14c$. Because the signal from transfer circuit $14a$, would remain on the output line $12a$ even when the defective connector $15c$, is selected, it would be very difficult to detect this defect because the good signal from transfer circuit $14a$, would in effect "cover" any defect in transfer circuit $14c$ or connector $15c$.

Figure 2:
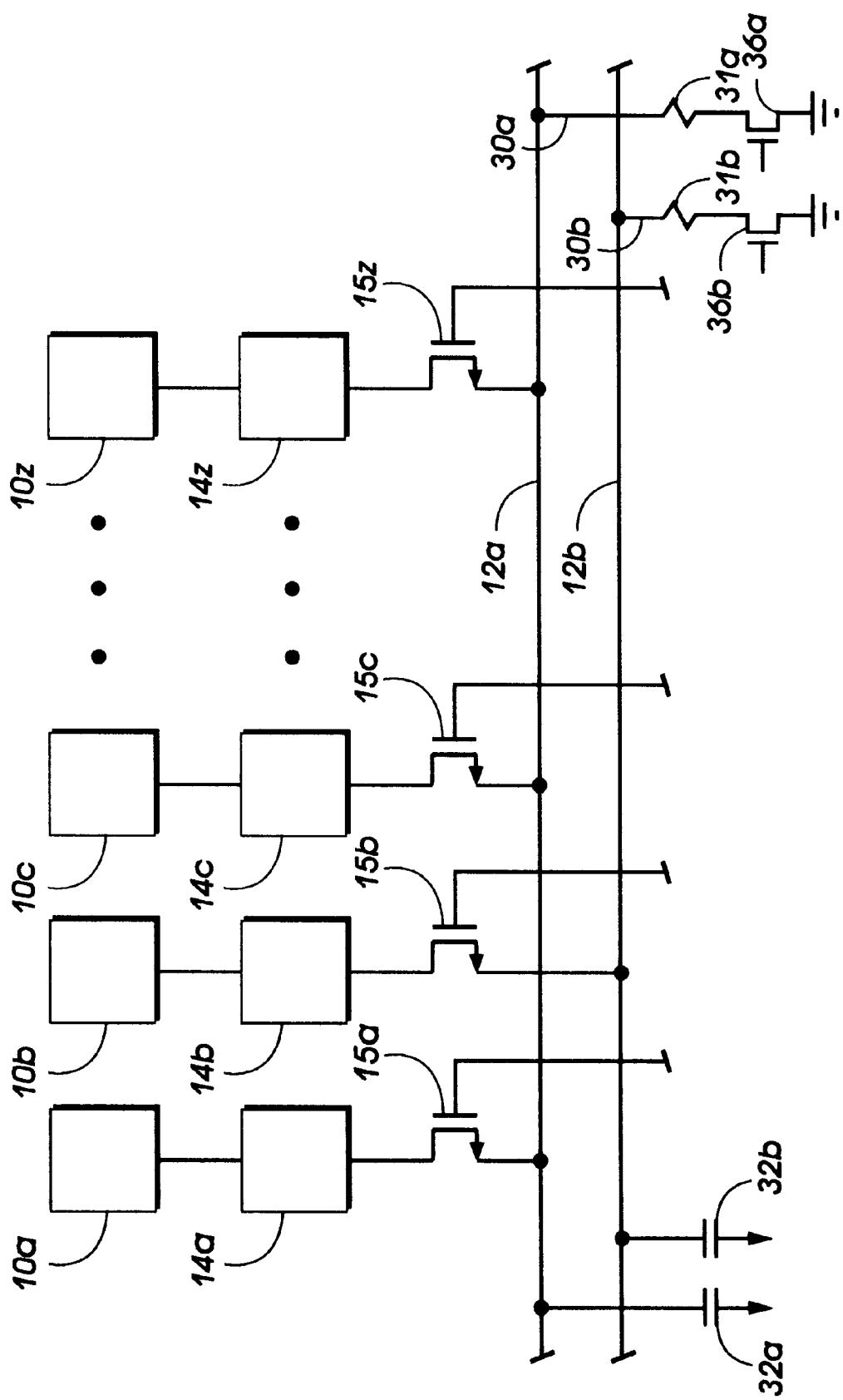
FIG. 2 is a schematic diagram showing photosensors and ancillary circuitry in an image sensor array in corporating the present invention.

The present invention proposes a design of readout circuitry in an image sensor array in which this particular type of defect, also known as a "tristated pixel," can be detected. FIG. 2 shows relevant portions of an image sensor array, with the addition of structure associated with the present invention. The circuitry of FIG. 2 is the same as that of FIG. 1, with the addition of special ground lines $30a$ (associated with output line $12a$) and $30b$ (associated with output line $12b$).

The ground lines are activated only when the image sensor array is in a special "test mode," such as by activating switches $36a$, $36a$. The basic function of grounding the output lines $12a$, $12b$ in the manner shown is to cause any bias on the output lines to drift to zero if a new signal (such as caused by the connection of a new transfer circuit onto the output line), does not occur within a predetermined time. By causing the bias to drift to zero fairly quickly, such a "dip" in the bias on the output line $12a$, at a time when a certain transfer circuit such as $14c$ is supposed to be biasing the output line, would be consistent with a determination that the transfer circuit 14c and/or connector 15c, is not functioning.

In order to enable this drift towards zero within a usable timeframe during the readout of signals along the output line, it is desirable to provide "pulldown resistors", such as shown as 31a and 31b, on the ground lines 30a, 30b respectively. The resistance of the pulldown resistors 31a, 31b is selected in conjunction with the natural or parasitic capacitance of the respective output lines 12a, 12b, such as shown as 32a, 32b in FIG. 2, and the typical readout rate by which the shift register 18 reads out the signals from the transfer circuits 14 by selecting a series of connectors 15. The capacitances 32a, 32b shown in FIG. 2 are preferably simply the parasitic capacitances associated with the output lines 12a, 12b on a chip, but it is conceivable to provide discrete capacitors to contribute to this function as well.

The combination of the capacitances 32a, 32b with the pulldown resistors 31a, 31b creates an RC circuit associated with each output line. The time constant of this RC circuit should be made consistent with the read out rate at which new signals are supposed to be entered onto each output line, so that, should there be a defective transfer circuit 14 or connector 15 failing to place a bias on the output line when selected, the bias will decrease out of a predetermined range within the "time slot" when the defective selector 15 is selected by shift register 18. By detecting that the bias on output line 12a slips out of predetermined range after a particular connector such as 15c, has been selected by shift register 18, one could detect and identify connector 15c, or perhaps its associated transfer circuit 14c, as the site of a defect in the sensor array.

Figure 3:
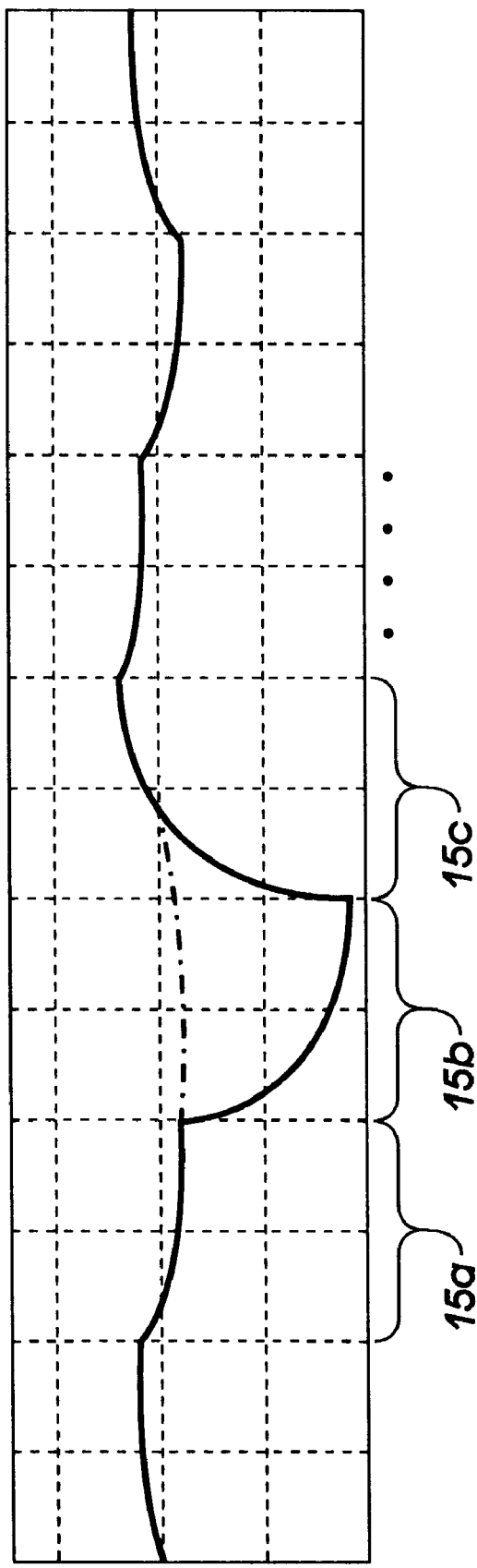
FIG. 3 is a sample waveform illustrating the function of the present invention in detecting defective circuitry associated with a photosensor in an image sensor array.

FIG. 3 is an example of a video output, as would appear, for example, on a output line such as 12a, in the presence of a defective connector associated with the output line. As one moves across in time from left to right in FIG. 3, the solid line represents the video outputs of a series of transfer circuits, such as 14a, 14c, etc., as shown, biasing the output line 12 as each transfer circuit is selected by its associated connector 15a, 15c, etc. In the example shown in FIG. 3, each discontinuity of the bias over time is consistent with the shift register 18 selecting a new transfer circuit 14 to output its signal onto the output line, as indicated by the time slots corresponding to connectors 15a, 15c, etc. on the x-axis of FIG. 3.

In FIG. 3, the bias level, represented by the heavy line, is typically bounded by a range which is consistent with a particular test light level exposing the photosensors 10a, 10b, etc. As mentioned above, this predetermined light level could be no light at all, causing the output of the transfer circuits in conditions of no light to be an average dark level. At one point in the example curve shown in FIG. 3, when connector 15c, is selected, the bias level curves sharply downward and indeed breaks out of the range specified by the dotted lines. Such a behavior would be consistent with a failure in the connector 15c, causing the pulldown resistor 31a to ground the bias of output line 12a fairly quickly.

Also shown in FIG. 3 is a dot-dash line showing what would have been the behavior of the bias on output line 12a had there been no pulldown resistor 31a: the charge from the signal from transfer circuit 14a, would simply have remained on the output line 12a even during the "time slot" in which transfer circuit 14c should have been placing its signal on the output line 12. However, because of the grounding through pulldown resistor 31a, once transfer circuit 14a, was no longer selected and no signal was forthcoming from transfer circuit 14c, the bias on the output line 12a quickly fell out of a predetermined range, allowing the defect on transfer circuit 14c and/or connector 15c, to be detected.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method for testing an image sensor array having an output line, a plurality of photosensors, each of the plurality of photosensors being associated with a connector to the output line, and a selector for selecting one of the plurality of photosensors to output a signal on the output line by closing the connector associated with the selected one of the plurality of photosensors, comprising the steps of:

connecting the output line to ground;

causing the selector to select a series of photosensors to output a signal onto the output line in a predetermined order and simultaneously monitoring a voltage on the output line; and determining when the monitored voltage on the output line falls outside a predetermined voltage range when the selector selects the photosensor associated with a connector.

2. The method of claim 1, further comprising the step of exposing the plurality of sensors to a predetermined light level.

3. The method of claim 2, wherein the predetermined light level is zero.

4. A method for testing an image sensor array having an output line, a plurality of photosensors, each of the plurality of photosensors being associated with a connector to the output line, and a selector for selecting one of the plurality of photosensors to output a signal on the output line by closing the connector associated with the selected one of the plurality of photosensors, comprising the steps of:

connecting the output line to ground; and causing the selector to select a series of photosensors to output a signal onto the output line in a predetermined order and simultaneously monitoring a voltage on the output line;

wherein there exists a resistance and capacitance between the output line and ground, and wherein the selector selects each photosensor for a predetermined time slot, and wherein the resistance is predetermined whereby a zero output into the output line when a photosensor is selected causes a bias on the output line to drift out of a predetermined range within said time slot.

5. The method of claim 4, further comprising the step of exposing the plurality of sensors to a predetermined light level.

6. The method of claim 5, wherein the predetermined light level is zero.

* * * * *